(12) United States Patent
Brewington et al.

(10) Patent No.: US 6,446,308 B1
(45) Date of Patent: Sep. 10, 2002

(54) TILT HINGE

(75) Inventors: James Gabriel Brewington; Richard Hunter Harris, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/764,821

(22) Filed: Jan. 17, 2001

(51) Int. Cl.⁷ .............................. E05D 11/08; E05F 1/08
(52) U.S. Cl. ............................... 16/337; 16/342; 16/306
(58) Field of Search .................... 16/337, 342, 285, 16/295, 306, 307, 308; 361/680–683; 248/917–920, 922, 923; 403/111, 120

(56) References Cited

U.S. PATENT DOCUMENTS

| | | | | |
|---|---|---|---|---|
| 4,871,422 A | | 10/1989 | Scardera et al. ............ 156/662 |
| 5,010,983 A | * | 4/1991 | Kitamura ..................... 16/342 |
| 5,018,244 A | * | 5/1991 | Hino ........................... 16/337 |
| 5,028,913 A | * | 7/1991 | Kitamura ..................... 16/239 |
| 5,037,231 A | * | 8/1991 | Kitamura ..................... 16/299 |
| 5,075,929 A | | 12/1991 | Chung ......................... 16/342 |
| 5,109,571 A | * | 5/1992 | Ohshima et al. ............. 16/284 |
| 5,173,837 A | * | 12/1992 | Blackwell et al. ........... 16/223 |
| 5,197,704 A | * | 3/1993 | Kitamura ..................... 16/342 |
| 5,566,048 A | * | 10/1996 | Esterberg et al. ............ 16/307 |
| 5,749,124 A | * | 5/1998 | Lu ............................... 16/295 |
| 5,894,633 A | | 4/1999 | Kaneko ........................ 16/306 |

* cited by examiner

*Primary Examiner*—Chuck Y. Mah
(74) *Attorney, Agent, or Firm*—J. Bruce Schelkopf; Winstead Sechrest & Minick

(57) ABSTRACT

A tilt mechanism of the type for interconnecting two members in a manner such that the two members may be moved and placed in various positions in relation to one another. The tilt mechanism comprising: an outer mandrel connected to a first member; an intermediate mandrel connected to a second member, the intermediate mandrel being movably disposed about a portion of the outer mandrel; an inner mandrel in functional connection with the outer and intermediate mandrel; a first spring functionally connected about a portion of the outer mandrel and the inner mandrel in a manner such that the first spring resists movement when moved in a first direction and releases tension when moved in a second direction; and a second spring functionally connected about a portion of the intermediate mandrel and the inner mandrel in a manner such that the second spring resists movement when moved in a second direction and releases tension when moved in a first direction.

35 Claims, 3 Drawing Sheets

TILT HINGE

FIELD OF THE INVENTION

The present invention relates generally to a mechanism for movable interconnecting two objects and more specifically to a tilt mechanism which utilizes an overrunning spring clutch type assembly that allows for angular rotation of the objects in relation to one another and allows placement of the objects in variable static positions based on the operator's requirements.

BACKGROUND OF THE INVENTION

Apparatuses such as laptop computers, handheld computers, touch screen systems, and other electronic devices typically include a base with keys and a cover rotationally coupled to the base. These devices are designed for portability and convenience wherein the cover serves both as protection and as a functional portion of the device. The cover often includes a liquid crystal display (LCD) or plasma display which is functionally connected to the terminal's memory to display information. The cover may be pivoted from a closed position in which it is folded against the base for storage or transport and to an open position for operation. In the open position the cover is pivoted to a position so that the user can effectively see the screen. The position of the screen will depend on factors such as, the height of the user, position of the user in relation to the device, and lighting conditions. These factors in conjunction with the portable nature of the device result in repetitive movement of the cover in relation to the base. This repetitive movement of the cover results in wear of the prior art connecting mechanisms, such as compressed friction washers, and failure of the mechanism to maintain the cover in a set position. This failure of stability of placement of the cover is pronounced when the cover includes a touch screen wherein force is applied against the screen and cover when in use.

It would be a benefit therefore to have a tilt mechanism that movably interconnects two members and allows the members to be repetitively moved and set in a plurality of positions relative to one another. It would be a further benefit to have a tilt mechanism that has sufficient strength to retain one member at a selected position even when that position is not perpendicular to the attached member. It would also be a benefit to have a tilt mechanism that permits variability in setting the rotational position of one member to the other member. It would be a further benefit to have a tilt mechanism that allows for a first amount of force to be utilized to move a member in a first direction and a second amount of force to be utilized to move a member in a second direction wherein the first and second force may be different which is particularly beneficial in touch screen systems.

SUMMARY OF THE INVENTION

It is thus an object of the present invention to provide a tilt mechanism that allows one member to be repetitively moved and set in a plurality of positions relative to each other.

It is a further object to provide a tilt mechanism that has sufficient strength to retain one member in a selected position even when that position is offset from vertical.

It is a further object to provide a tilt mechanism that permits variability in the setting the rotational position of one member to the attached member.

It is a further object to provide a tilt mechanism that allows for a first amount of force to be utilized to move a member in a first direction and a second amount of force to be utilized to move a member in a second direction, wherein the first and second force may be different.

Accordingly, a tilt mechanism of the type for interconnecting two members in a manner such that the two members may be moved and placed in various positions in relation to one another. The tilt mechanism comprising: an outer mandrel connected to a first member; an intermediate mandrel connected to a second member, the intermediate mandrel being movably disposed about a portion of the outer mandrel; an inner mandrel in functional connection with the outer and intermediate mandrel; a first spring functionally connected about a portion of the outer mandrel and the inner mandrel in a manner such that the first spring resists movement when moved in a first direction and releases tension when moved in a second direction; and a second spring functionally connected about a portion of the intermediate mandrel and the inner mandrel in a manner such that the second spring resists movement when moved in a second direction and releases tension when moved in a first direction.

The foregoing has outlined rather broadly the features and technical advantages of the present invention in order that the detailed description of the invention that follows may be better understood. Additional features and advantages of the invention described hereinafter form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
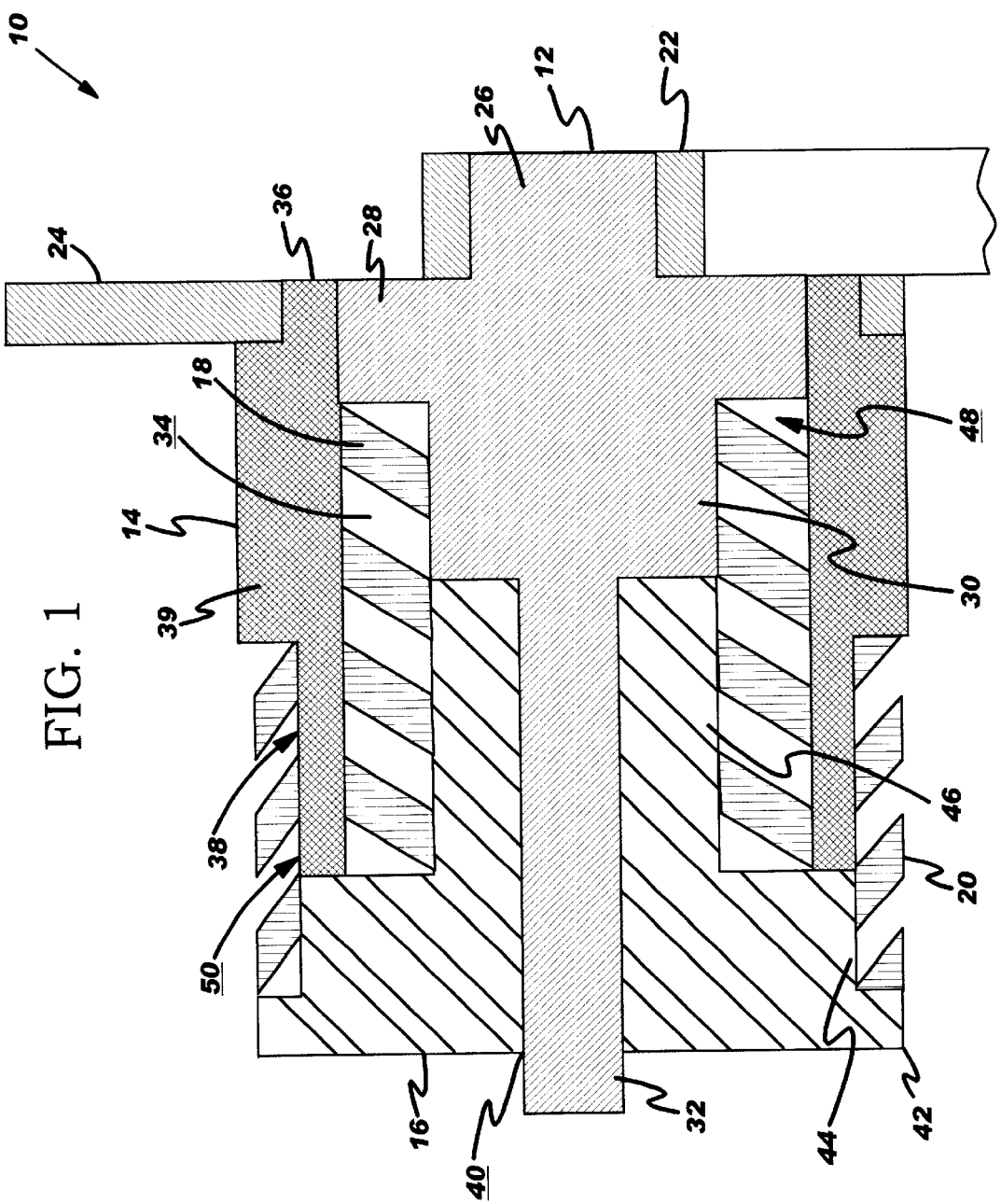
FIG. 1 is a cross-sectional view of the tilt mechanism of the present invention.

Refer now to the drawings wherein depicted elements are not necessarily shown to scale and wherein like or similar elements are designated by the same reference numeral through the several figures.

FIG. 1 is a cross-sectional view of the tilt mechanism of the present invention generally designated by the numeral 10. Tilt mechanism 10 includes an outer mandrel 12, an intermediate mandrel 14, an inner mandrel 16, a first spring 18, and a second spring 20. Tilt mechanism 10 is functionally connected between a first member 22 and a second member 24 in a manner such that first and second members 22, 24 can be angularly moved in relation to each other and maintained in a plurality of positions. Members 22 and 24 may be brackets that are connected to other portions of a device. An example would be first member 22 being a bracket connected to a keyboard or base of a portable computer and second member 24 being a bracket connected to the display portion of a portable computer. Although only one tilt mechanism 10 is shown in the embodiment, it should be recognized that more than one tilt mechanism 10 may be utilized, for example two tilt mechanisms 10 connecting a keyboard with a display unit. It should be readily recognized that tilt mechanism 10 may be utilized for connecting many devices wherein at least two objects are movably interconnected and wherein it is desired to maintain the two objects in various angular positions in relation to each other.

Outer mandrel 12 may be constructed of any suitable material such as a hard plastic for use in a portable computer. Outer mandrel 12 has an anterior portion 26 for connecting to first member 22. First member 22 is fixedly connected to anterior portion 26 by adhesive, chemical welding, welding, retaining rings or any other manner which maintains outer mandrel 12 in a fixed position in relation to first member 22. Outer mandrel 12 forms an expanded diameter portion 28 adjacent to anterior portion 26. Adjacent to expanded portion 28 is a friction portion 30 which has a smaller diameter than expanded portion 28. Extending from friction portion 30 is an elongated extension 32. Elongated extension 32 may form an internal bore for disposing a locking element such as a screw.

Intermediate mandrel 14 forms an internal bore 34 therethrough. Internal bore 34 has an inside diameter approximate the outer diameter of expanded portion 28 of outer mandrel 12 so that expanded section 28 may be disposed therein. Intermediate mandrel 14 is adapted to rotate about outer mandrel 12.

Second member 24 is fixedly connected to a first end 36 of intermediate member 14. Second member 24 and intermediate member 14 may be connected with adhesive, chemical welding, welding, retaining rings or any other manner which maintains intermediate member 14 in a fixed position in relation to second member 24. When second member 24 is moved in relation to first member 22, second member 24 and intermediate mandrel 14 rotate about outer mandrel 12.

Intermediate mandrel 14 further includes a recessed outer diameter section 38 distal from first end 36. Recessed section 38 has a smaller outer diameter than the body 39 of intermediate mandrel 14 so as to allow the functional placement of second spring 20.

Figure 2:
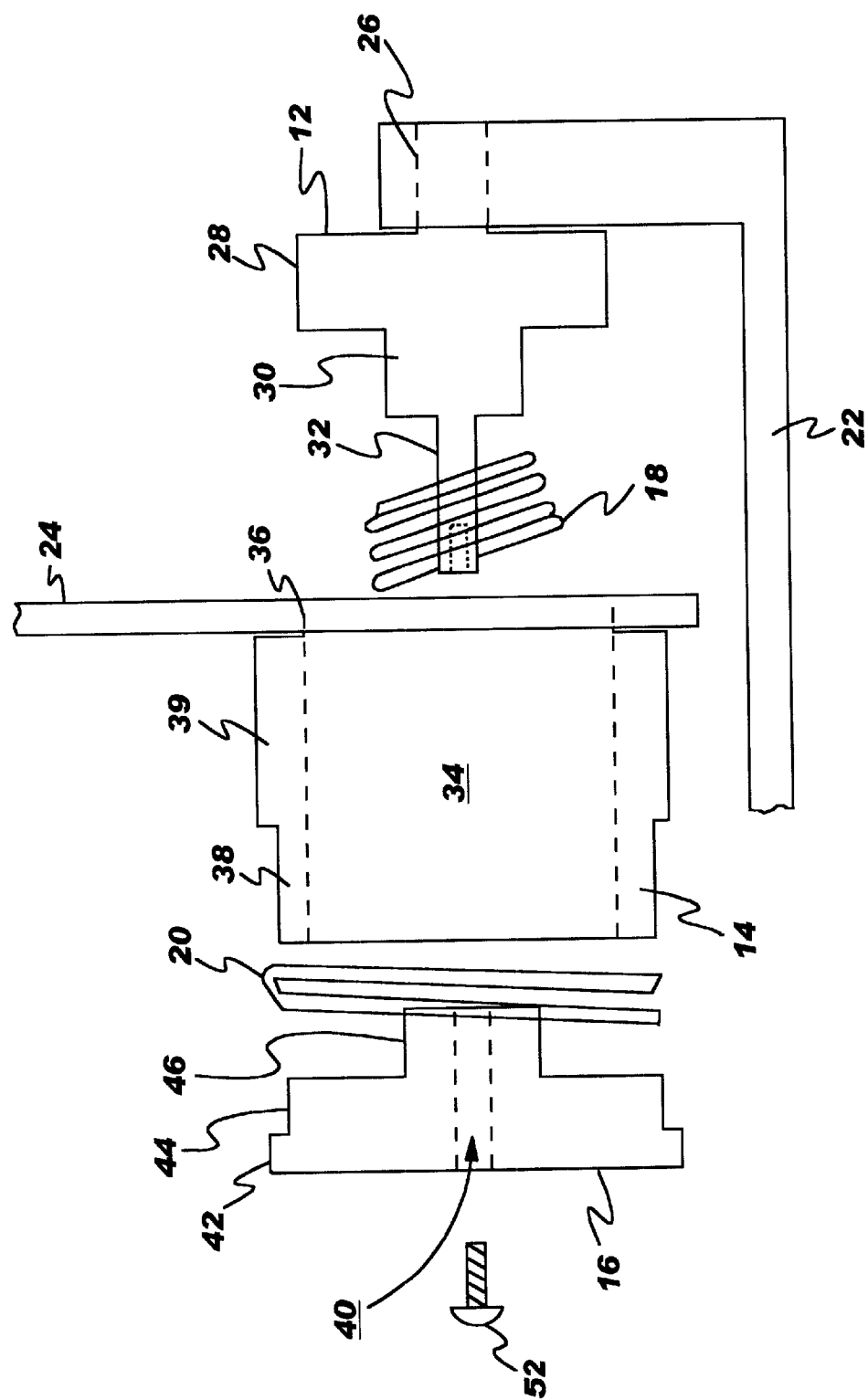
FIG. 2 is an exploded, side view of the tilt mechanism of the present invention.

Inner mandrel 16 forms a pathway 40 therethrough approximate the longitudinal axis of inner mandrel 16. Pathway 40 is sized to dispose elongated extension 32 of outer mandrel 12 therein. Inner mandrel 16 may be rotatably connected to outer mandrel 12 by a retaining screw 52 or the like as shown in FIG. 2.

Inner mandrel 16 includes a first section 42, second section 44, and a third section 46 which are formed in stair step fashion along the exterior thereof. First section 42 has an outer diameter approximate the outer diameter of body 39 of intermediate mandrel 14. Second section 44 has an outside diameter less than that of first section 42 and approximate the outside diameter of recessed portion 38 of intermediate mandrel 14. Third section 46 has an outside diameter smaller than second section 44 and approximate the outside diameter of friction section 30 of outer mandrel 12.

When mandrels 12, 14, and 16 are functionally connected, a first spring cavity 48 and a second spring cavity 50 are formed. Each cavity 48 and 50 are adapted for holding a spring to provide resistance to the movement of sections 22 and 24 in relation to each other.

First spring cavity 48 is defined between second section 44 of inner mandrel 16 and expanded portion 28 of outer mandrel 12, along the outside diameter of third section 46 of mandrel 16 and the outside diameter of friction section 30 of mandrel 12, and along the inside diameter of bore 34 of mandrel 14. First spring cavity 48 is adapted to hold first spring 18 about friction section 30 of outer mandrel 12 and third section 46 of inner mandrel 16.

Second spring cavity 50 is defined between body 39 of mandrel 14 and first section 42 of mandrel 16 along the outside diameter of second section 44 of mandrel 16 and the outside diameter of recessed portion 38 of mandrel 14. Second spring cavity 50 is adapted to hold second spring 20 about recessed portion 38 of mandrel 14 and second section 44 of mandrel 16.

FIG. 2 is an exploded, side view of tilt mechanism 10 of the present invention. FIG. 2 is representative of construction of tilt mechanism 10. As shown, first member 22 is fixedly connected to outer mandrel 12. Second member 24 is fixedly connected to intermediate mandrel 14 at first end 36.

First spring 18 is a helical spring desirably having a inside diameter less than the outside diameter of friction section 30 of mandrel 12 and the outside diameter of third section 46 of mandrel 16. First spring 18 is disposed about friction section 30 of mandrel 12.

Intermediate mandrel 14 is placed so that the majority portion of mandrel 12 is disposed within bore 34 of mandrel 14. Outer mandrel 12 is disposed within bore 34 of intermediate mandrel 14 in a manner such that mandrel 14 may rotate about mandrel 12.

Second spring 20 is a helical spring desirably having an inside diameter less than the outside diameter of recessed portion 38 of mandrel 14 and second portion 44 of mandrel 16. Second spring 20 is disposed about recessed portion 38 of mandrel 14.

Inner mandrel 16 is attached by disposing elongated extension 32 of mandrel 12 into pathway 40 of mandrel 16. Inner mandrel 16 is moved towards mandrel 12 so that third section 46 is inserted within first spring 18 and second section 44 is disposed within second spring 20. Inner mandrel 16 is rotatably connected to outer mandrel 12 such as by, but not limited to, spring 18. Screw 52 prevents mandrel 16 from gradually creeping away from mandrel 12 during rotation due to the spring force.

First spring 18 is oriented in a direction so as to tighten about third section 46 of inner mandrel 16 and friction section 30 of outer mandrel 12 when moved in a first direction and unwind when moved in a second direction. Second spring 20 is oriented in a direction so as to tighten about recessed portion 38 of intermediate mandrel 14 and second portion 44 of inner mandrel 16 when moved in a second direction and unwind when moved in a first direction.

Figure 3:
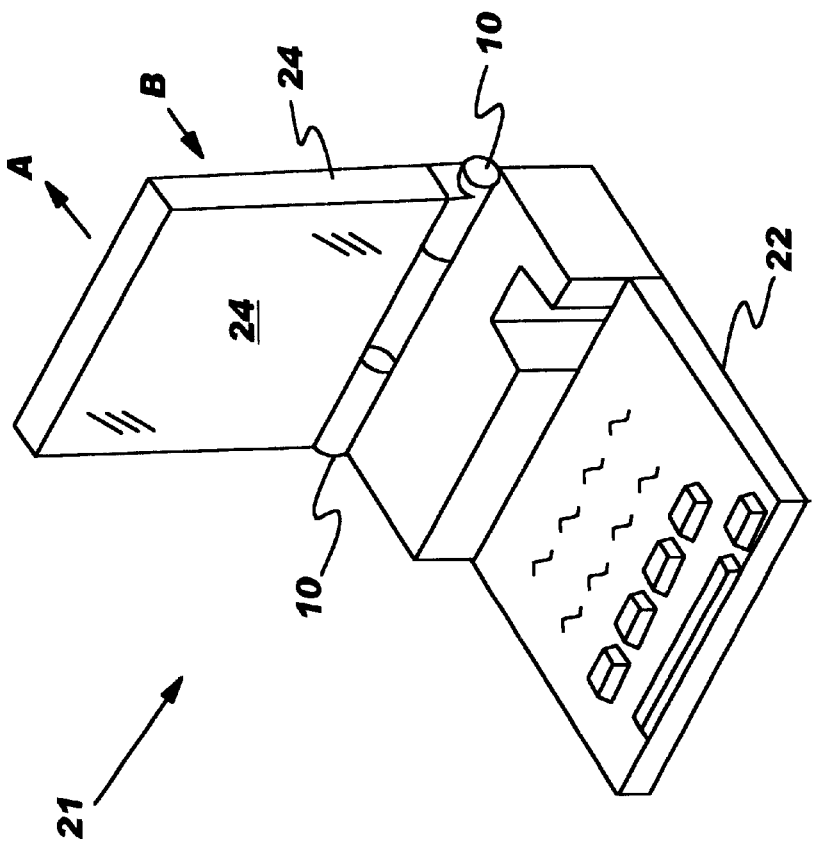
FIG. 3 is a perspective view of a touch screen device utilizing a tilt mechanism of the present invention.

FIG. 3 is a perspective view of a touch screen device 21 utilizing tilt mechanism 10 of the present invention. Device 21 is a touch screen device such as used in a retail store. Device 21 includes a touch screen 24 that allows the user to select options by contacting the screen with a finger or wand. Touch screen 24 is movably connected to a base 22 which may include a data processing system having a central processing unit (CPU), such as a conventional microprocessor, and a number of other units interconnected via a system bus. The data processing system includes a random access memory (RAM) and a read only memory (ROM). The system may include an I/O adapter for connecting peripheral devices such as disk units and tape drives to the bus, a user interface adapter for connecting a keyboard, a mouse and/or other user interface devices such as a touch screen 24 or other display device to the bus, a communication adapter for connecting the data processing system to a data processing network.

In the application as shown in FIG. 3, tilt mechanism 10 requires a greater force to move touch screen 24 in the direction shown by the letter "A" to resist movement of screen 24 when in use than the force required to move screen 24 in the direction indicated by "B."

Use of tilt mechanism 10 of the present invention is described with reference to FIGS. 1 through 3. Tilt mechanism 10 is described in relation to use with a touch screen computer wherein first member 22 is a base that may include a CPU and a keyboard, and second member 24 may be a touch screen display unit. One and desirably two tilt mechanisms 10 are utilized to interconnect first member 22 and second member 24. In typical operation second member 24 will be at an angle relative to first member 22. Depending on the user of the device and environmental conditions it may be desired to place and maintain second member 24 at any number of angular positions from first member 22. It should also be considered that second member 24 is a weight bearing member and may have forces applied to it during use such as in touch screen systems. In situations such as with a touch screen it is very beneficial to have a tilt mechanism 10 that allows movement of the members within reference to each other while resisting movement when the touch screen is being used. For example, tilt mechanism resisting movement when a force is applied in a direction A and easily moved when a force is applied in the direction B.

When second member 24 is moved in a first direction, first spring 18 tightens about mandrels 12 and 16 and second spring 20 unwinds. When second member 24 is moved in a second direction, first spring 18 unwinds and second spring 20 tightens about mandrels 14 and 16. Tilt mechanism 10 is, in effect, an overrunning spring clutch that is designed to slip in either direction, but at different values of applied torque. By altering the spring constants between spring 18 and 20, a force may be applied to second member 24, such as in a touch screen application, without excessive movement of second member 24 while still allowing desired movement and variable placement of second member 24.

Although the present invention and its advantages have been described in detail, it should be understood that various changes, substitutions and alterations can be made herein without departing from the spirit and scope of the invention as defined by the appended claims. For example, various modes and material of construction may be utilized, various orientation of springs and spring constants, manner of connection of elements, and order of connection of elements may be altered without departing from the spirit and scope of the invention as claimed.

What is claimed is:

1. A tilt mechanism for interconnecting a first and second member of an apparatus, said tilt mechanism comprising:
   an outer mandrel connected to a first member;
   an intermediate mandrel connected to a second member and said intermediate mandrel being movably disposed about a portion of said outer mandrel;
   an inner mandrel in functional connection with said outer and said intermediate mandrel;
   a first spring functionally connected about a portion of said outer mandrel and said inner mandrel in a manner such that said first spring resists movement when moved in a first direction and releases tension when moved in a second direction; and
   a second spring functionally connected about a portion of said intermediate mandrel and said inner mandrel in a manner such that said second spring resists movement when moved in said second direction and releases tension when moved in said first direction.

2. The tilt mechanism of claim 1, wherein said first spring is frictionally disposed about said outer mandrel and said inner mandrel.

3. The tilt mechanism of claim 1 wherein said second spring is frictionally connected about said intermediate mandrel and said inner mandrel.

4. The tilt mechanism of claim 1 wherein:
   said first spring is frictionally disposed about said outer mandrel and said inner mandrel; and
   said second spring is frictionally connected about said intermediate mandrel and said inner mandrel.

5. The tilt mechanism of claim 1 wherein:
   said outer mandrel has an expanded section, a friction section having a smaller diameter than said expanded section, and an elongated section having a smaller diameter than said friction section; and
   said inner mandrel has a first section, a second section having a smaller diameter than said first section, a third section having a smaller diameter than said second section, and a pathway formed through said inner mandrel;
   wherein said elongated section is disposed within said pathway.

6. The tilt mechanism of claim 5 wherein said first spring is frictionally disposed about said third section of said inner mandrel and said friction section of said outer mandrel.

7. The tilt mechanism of claim 5 wherein said third section of said inner mandrel has approximately the same outside diameter as said friction section of said outer mandrel.

8. The tilt mechanism of claim 7 wherein said first spring is frictionally disposed about said third section of said inner mandrel and said friction section of said outer mandrel.

9. The tilt mechanism of claim 1 wherein:
   said intermediate mandrel has a body, a recessed portion having a smaller outside diameter than said body, and a bore formed through said mandrel; and
   said inner mandrel has a first section, a second section having a smaller diameter than said first section, a third section having a smaller diameter than said second section, and a pathway formed through said inner mandrel wherein said inner mandrel is positioned adjacent to said intermediate mandrel.

10. The tilt mechanism of claim 9 wherein said second section of said inner mandrel having approximately the same outside diameter as said recessed portion of said intermediate mandrel.

11. The tilt mechanism of claim 10 herein said second spring is frictionally disposed about said second section of said inner mandrel and said recessed portion of said intermediate mandrel.

12. The tilt mechanism of claim 1 wherein:
   said outer mandrel has an expanded section, a friction section having a smaller diameter than said expanded section, and an elongated section having a smaller diameter than said friction section;
   said intermediate mandrel has a body, a recessed portion having a smaller outside diameter than said body, and a bore formed through said mandrel; and
   said inner mandrel has a first section, a second section having a smaller diameter than said first section, a third section having a smaller diameter than said second section, and a pathway formed through said inner mandrel;
   wherein said elongated section is disposed within said pathway.

13. The tilt mechanism of claim 12 wherein said first spring is frictionally disposed about said third section of said inner mandrel and said friction section of said outer mandrel.

14. The tilt mechanism of claim 12 wherein said second spring is frictionally disposed about said second section of said inner mandrel and said recessed portion of said intermediate mandrel.

15. The tilt mechanism of claim 12 wherein:
    said first spring is frictionally disposed about said third section of said inner mandrel and said friction section of said outer mandrel; and
    said second spring is frictionally disposed about said second section of said inner mandrel and said recessed portion of said intermediate mandrel.

16. A tilt mechanism for interconnecting a first and second member of an apparatus, said tilt mechanism comprising:
    an outer mandrel connected to a first member, said outer mandrel having an expanded section, a friction section having a smaller diameter than said expanded section, and an elongated section having a smaller diameter than said friction section;
    an intermediate mandrel connected to a second member, said intermediate mandrel having a body, a recessed portion having a smaller outside diameter than said body, and a bore formed through said mandrel wherein a portion of said outer mandrel is disposed within said bore;
    an inner mandrel in functional connection with said outer and said intermediate mandrel, said inner mandrel having a first section, a second section having a smaller diameter than said first section, a third section having a smaller diameter than said second section, and a pathway formed through said inner mandrel;
    a first spring functionally connected about a portion of said outer mandrel and said inner mandrel in a manner such that said first spring resists movement when moved in a first direction and releases tension when moved in a second direction; and
    a second spring functionally connected about a portion of said intermediate mandrel and said inner mandrel in a manner such that said second spring resists movement when moved in said second direction and releases tension when moved in said first direction.

17. The tilt mechanism of claim 16 wherein:
    said third section of said inner mandrel has approximately the same outside diameter as said friction section of said outer mandrel; and
    said second section of said inner mandrel having approximately the same outside diameter as said recessed portion of said intermediate mandrel.

18. The tilt mechanism of claim 17 wherein:
    said first spring is frictionally disposed about said third section of said inner mandrel and said friction section of said outer mandrel; and
    said second spring is frictionally disposed about said second section of said inner mandrel and said recessed portion of said intermediate mandrel.

19. A tilt mechanism for interconnecting a first and second member of an apparatus, said tilt mechanism comprising:
    an outer mandrel connected to a first member, said outer mandrel having an expanded section, a friction section having a smaller diameter than said expanded section, and an elongated section having a smaller diameter than said friction section;
    an intermediate mandrel connected to a second member, said intermediate mandrel having a body, a recessed portion having a smaller outside diameter than said body, and a bore formed through said mandrel wherein a portion of said outer mandrel is disposed;
    an inner mandrel having a first section, a second section having a smaller diameter than said first section, a third section having a smaller diameter than said second section, and a pathway formed through said inner mandrel, said elongated section of said outer mandrel being disposed within said pathway;
    a first spring functionally connected about a portion of said third section of said inner mandrel and said friction section of said outer mandrel in a manner such that said first spring resists movement when moved in a first direction and releases tension when moved in a second direction; and
    a second spring functionally connected about a portion of said recessed section of said intermediate mandrel and said second section of said inner mandrel in a manner such that said second spring resists movement when moved in said second direction and releases tension when moved in said first direction.

20. A device having a touch screen, said device comprising:
    a base;
    a touch screen device; and
    a tilt mechanism movably connecting said touch screen device with said base, wherein said tilt mechanism requires a greater force to move said touch screen in a first direction then is required to move said touch screen in a second direction,
    wherein said tilt mechanism comprises
        an outer mandrel connected to said touch screen;
        an intermediate mandrel connected to base and said intermediate mandrel being movably disposed about a portion of said outer mandrel;
        an inner mandrel in functional connection with said outer and said intermediate mandrel;
        a first spring functionally connected about a portion of said outer mandrel and said inner mandrel in a manner such that said first spring resists movement when moved in a first direction and releases tension when moved in a second direction; and
        a second spring functionally connected about a portion of said intermediate mandrel and said inner mandrel in a manner such that said second spring resists movement when moved in said second direction and releases tension when moved in said first direction.

21. The tilt mechanism of claim 20, wherein said first spring is frictionally disposed about said outer mandrel and said inner mandrel.

22. The tilt mechanism of claim 20 wherein said second spring is frictionally connected about said intermediate mandrel and said inner mandrel.

23. The tilt mechanism of claim 20 wherein:
    said first spring is frictionally disposed about said outer mandrel and said inner mandrel; and
    said second spring is frictionally connected about said intermediate mandrel and said inner mandrel.

24. The tilt mechanism of claim 20 wherein:
    said outer mandrel has an expanded section, a friction section having a smaller diameter than said expanded section, and an elongated section having a smaller diameter than said friction section; and
    said inner mandrel has a first section, a second section having a smaller diameter than said first section, a third section having a smaller diameter than said second section, and a pathway formed through said inner mandrel;

wherein said elongated section is disposed within said pathway.

25. The tilt mechanism of claim 24 wherein said first spring is frictionally disposed about said third section of said inner mandrel and said friction section of said outer mandrel.

26. The tilt mechanism of claim 24 wherein said third section of said inner mandrel has approximately the same outside diameter as said friction section of said outer mandrel.

27. The tilt mechanism of claim 26 wherein said first spring is frictionally disposed about said third section of said inner mandrel and said friction section of said outer mandrel.

28. A method for movably interconnecting two members of a device, said method comprising the steps of:

provides a base;

providing a touch screen device; and connecting said base and said touch screen via a tilt mechanism, wherein said tilt mechanism requires a greater force to move said touch screen in a first direction then is required to move said touch screen in a second direction, wherein said tilt mechanism comprises an outer mandrel connected to said touch screen;

an intermediate mandrel connected to base and said intermediate mandrel being movably disposed about a portion of said outer mandrel;

an inner mandrel in functional connection with said outer and said intermediate mandrel;

a first spring functionally connected about a portion of said outer mandrel and said inner mandrel in a manner such that said first spring resists movement when moved in a first direction and releases tension when moved in a second direction; and a second spring functionally connected about a portion of said intermediate mandrel and said inner mandrel in a manner such that said second spring resists movement when moved in said second direction and releases tension when moved in said first direction.

29. The tilt mechanism of claim 28, wherein said first spring is frictionally disposed about said outer mandrel and said inner mandrel.

30. The tilt mechanism of claim 29 wherein said second spring is frictionally connected about said intermediate mandrel and said inner mandrel.

31. The tilt mechanism of claim 28 wherein:

said first spring is frictionally disposed about said outer mandrel and said inner mandrel; and said second spring is frictionally connected about said intermediate mandrel and said inner mandrel.

32. The tilt mechanism of claim 28 wherein:

said outer mandrel has an expanded section, a friction section having a smaller diameter than said expanded section, and an elongated section having a smaller diameter than said friction section; and said inner mandrel has a first section, a second section having a smaller diameter than said first section, a third section having a smaller diameter than said second section, and a pathway formed through said inner mandrel;

wherein said elongated section is disposed within said pathway.

33. The tilt mechanism of claim 32 wherein said first spring is frictionally disposed about said third section of said inner mandrel and said friction section of said outer mandrel.

34. The tilt mechanism of claim 32 wherein said third section of said inner mandrel has approximately the same outside diameter as said friction section of said outer mandrel.

35. The tilt mechanism of claim 34 wherein said first spring is frictionally disposed about said third section of said inner mandrel and said friction section of said outer mandrel.

* * * * *